March 18, 1947. F. B. GRAHAM 2,417,644
HAND TRUCK
Filed Nov. 19, 1945
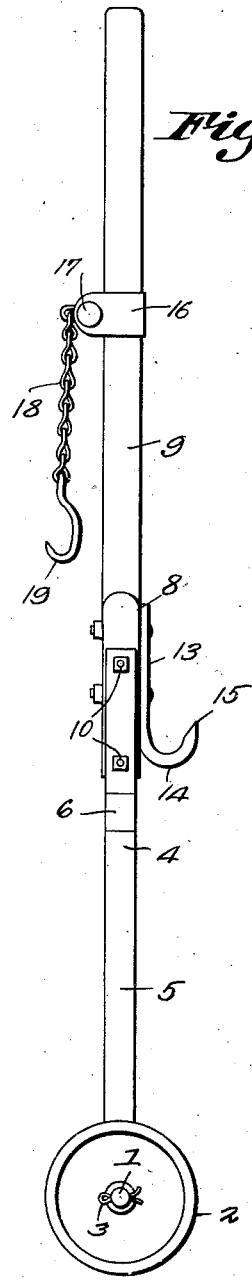
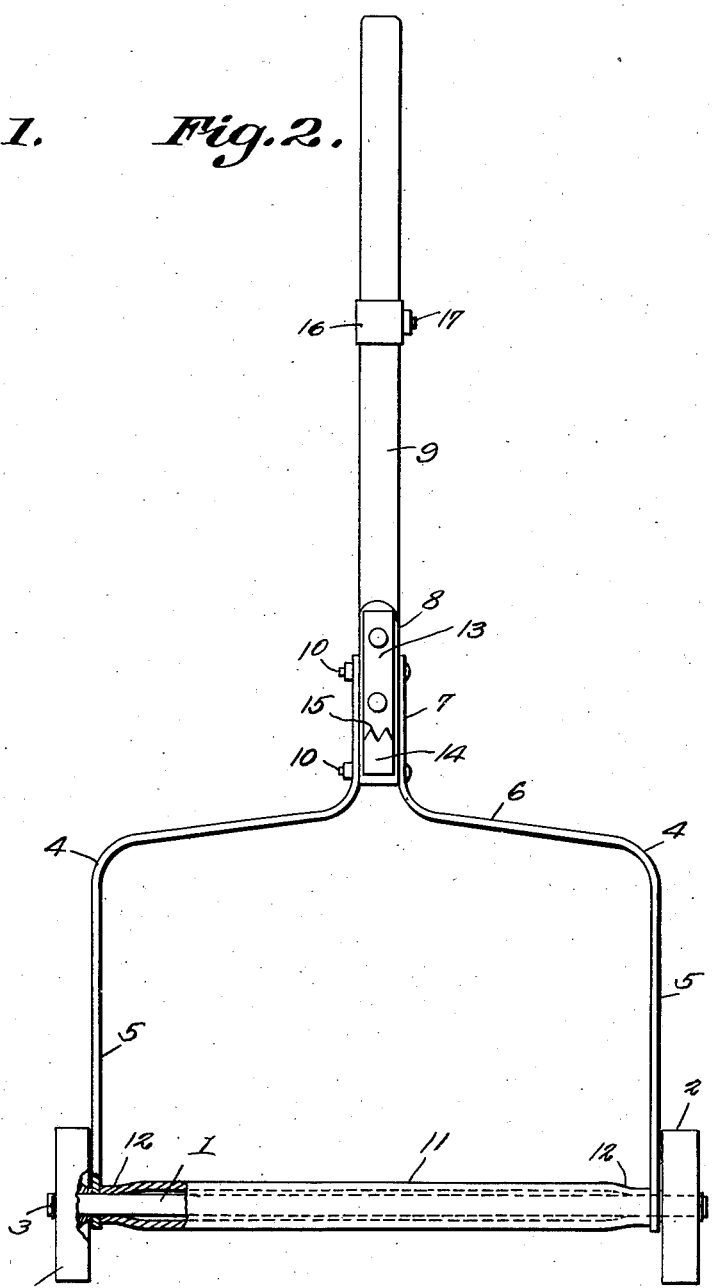
F. B. Graham
INVENTOR.
BY Knowles
ATTORNEYS.

Patented Mar. 18, 1947

2,417,644

UNITED STATES PATENT OFFICE 2,417,644

HAND TRUCK

Frank B. Graham, Lansing, Mich.

Application November 19, 1945, Serial No. 629,419

3 Claims. (Cl. 214—65.4)

This invention relates to hand trucks, an object being to provide a simple and inexpensive structure which is easy to manipulate and is especially useful for carrying barrels, boxes, milk cans, and baskets.

It is a further object to provide a truck which can be used for handling items such as stated whether or not the lids are on or off.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a side elevation of the truck.

Figure 2 is a front elevation thereof, portions of the axle sleeve and one of the wheels being shown in section.

Referring to the figures by characters of reference, 1 designates an axle on the end portions of which are mounted supporting wheels 2 which can be held in place by cotter pins 3 or the like. Mounted on the axle and bearing against the inner sides of the hubs of the wheels are opposed frame members 4 which can be formed of heavy metal strips bent to provide substantially parallel side arms 5 which merge into converging upper arms 6 having extensions 7 which preferably are parallel. These extensions bear against the opposite side of the squared end portion 8 of an elongated handle 9, parts being held rigidly assembled by bolts 10 or the like.

A spacing sleeve 11 surrounds the axle 1 and is spaced therefrom except at its ends where it is preferably contracted, as at 12, and abuts against the side arms 5. This sleeve 11 constitutes a load support and that by providing the contracted ends annular recesses are formed whereby when a flanged object, such as a barrel, is mounted on the sleeve, the bottom of the container can rest flat upon the sleeve while the flanges will be supported above or on the contracted portions.

Secured to one of the flat faces of the annular end 8 of handle 9 is a plate 13, the lower end of which is bent forwardly and upwardly to provide a hook 14 which is preferably serrated or toothed at its free end as indicated at 15.

Connected to the handle 9 at a point well above the plate 13 is a sleeve 16 having a cross or tie bolt 17 which serves to clamp it tightly to the handle. This bolt also is engaged by one end of a chain 18 or to the flexible element which serves to support a hook 19. This hook preferably is suspended at that side of the handle opposite to the side on which the plate 13 is mounted.

In practice should it be desired, for example, to move a bushel basket by means of this truck, the operator would tip the truck forward until hook 14 became engaged in the handle of the basket. Then by pulling the handle back the basket would be drawn over the roller or sleeve 11 and loaded without being touched by the operator. Thus the basket could readily be moved from place to place without great effort on the part of the user.

Should a barrel be mounted on the sleeve 11, the upper rim thereof could be engaged by the hook 19. This same hook can be employed for gripping the far edge of a box or other package. In fact by using one side or the other of the truck a wide variety of objects can be mounted thereon and held either by hook 14 or by hook 19 according to the size and shape of the article. Importance is attached to the reversibility of the truck whereby the foregoing advantages are possible.

By providing the sleeve 16 it is possible to adjust the flexible element 18 and its hook 19 longitudinally of the handle.

What is claimed is:

1. A reversible hand truck including an elongated handle, diverging members fixedly secured thereto and supported in the same plane therewith, said members including side arms, a wheel supported axle extending through the side arms, and having its ends projecting beyond the side arms, the wheels being mounted on the projecting ends, a combined balancing and spacing sleeve having contracted ends engaging the axle, said sleeve being interposed between the arms, and having its ends abutting thereagainst, a flexible element adjustably connected to the handle and a load engaging hook carried by the said element.

2. A reversible hand truck including an elongated handle, diverging members fixedly secured thereto and supported in substantially the same plane therewith, said members including side arms, a wheel supported axle extending through the side arms, a combined balancing and spacing sleeve having contracted ends engaging the axle, said sleeve being interposed between the arms, a flexible element adjustably connected to one side of the handle and oppositely disposed load engaging hooks connected to said element and the handle respectively.

3. In a reversible hand truck, the combination of a tubular handle, frame members connected thereto at one end, said frame members diverging widely from said point of connection and being then bent to provide parallel side arms, the frame members being maintained in the same plane with the handle so as to provide a hand truck of straight formation from end to end, a wheel-supported axle journaled in the free ends of the side arms, the ends of the axle projecting outside the side arms, and the supporting wheels being mounted on said projecting ends, a combined balancing and spacing sleeve mounted on the axle and having its ends abutting against the side arms, the sleeve being formed with an intermediate portion having a relatively greater inner circumference than the circumference of the axle, and with contracted end portions snugly engaging the axle, a plate detachably secured to the handle and having a load-engaging hook, a sleeve attachable to the handle in positions of adjustment longitudinal of the handle, a flexible element connected at one end to said latter sleeve, and a load-engaging hook connected to the flexible element at its other end.

FRANK B. GRAHAM.

REFERENCES CITED

The following references are of record in the file of this patent:

UNITED STATES PATENTS

| Number | Name | Date |
|---|---|---|
| 583,535 | Kilburn | June 1, 1895 |
| 896,228 | Moore | Aug. 18, 1908 |
| 1,155,081 | More | Sept. 28, 1915 |
| 1,363,499 | Davis | Dec. 28, 1920 |

FOREIGN PATENTS

| Number | Country | Date |
|---|---|---|
| 783,825 | French | July 18, 1935 |